United States Patent
Anderson et al.

(10) Patent No.: US 11,174,963 B2
(45) Date of Patent: Nov. 16, 2021

(54) COKER SWITCH VALVE OPERATING SYSTEM AND METHOD

(71) Applicant: Mogas Industries, Inc., Houston, TX (US)

(72) Inventors: Alfred Lewis Anderson, Houston, TX (US); Asmaa Sadek Kassab, Cypress, TX (US); Phillip M. Inman, Houston, TX (US)

(73) Assignee: Mogas Industries, Inc., Houston, TX (US)

( * ) Notice: Subject to any disclaimer, the term of this patent is extended or adjusted under 35 U.S.C. 154(b) by 0 days.

(21) Appl. No.: 16/493,283

(22) PCT Filed: May 17, 2019

(86) PCT No.: PCT/US2019/032971
§ 371 (c)(1),
(2) Date: Sep. 11, 2019

(87) PCT Pub. No.: WO2019/222691
PCT Pub. Date: Nov. 21, 2019

(65) Prior Publication Data
US 2021/0140561 A1    May 13, 2021

Related U.S. Application Data

(60) Provisional application No. 62/673,581, filed on May 18, 2018, provisional application No. 62/673,703, filed on May 18, 2018.

(51) Int. Cl.
*F16K 35/02* (2006.01)
*C10B 31/12* (2006.01)
(Continued)

(52) U.S. Cl.
CPC .......... *F16K 35/025* (2013.01); *C10B 31/12* (2013.01); *F16K 5/0647* (2013.01); *F16K 37/0041* (2013.01)

(58) Field of Classification Search
CPC .... F16K 5/0647; F16K 31/535; F16K 35/025; F16K 35/06; F16K 35/10; F16K 37/0041; F16K 37/0075; F16K 37/008; C10B 31/12
(Continued)

(56) References Cited

U.S. PATENT DOCUMENTS 3,540,481 A * 11/1970 Peters, Jr. ............... F16K 35/16
137/797
4,072,161 A *  2/1978 Schoeneweis ........ F16K 5/0657
137/68.16
(Continued)

FOREIGN PATENT DOCUMENTS

JP       2004124982       4/2004

OTHER PUBLICATIONS

PCT/US2019/32963; Aug. 2, 2019; ISR/WO.
(Continued)

*Primary Examiner* — Kevin F Murphy
*Assistant Examiner* — Jonathan J Waddy
(74) *Attorney, Agent, or Firm* — Daniel N. Lundeen; Lundeen & Lundeen PLLC

(57) ABSTRACT

An operating system for switching a coker switch valve to drum A, drum B, and bypass. The system has a shear pin linkage between the actuator and the valve stem and a position indicator independent of the actuator, to maintain functionality in the event of shear pin failure; and/or lockout functionality to prevent an inadvertent switch to bypass
(Continued)

when switching between drum A and drum B and to lock down bypass mode to prevent an inadvertent switch from bypass to an open drum.

23 Claims, 9 Drawing Sheets

(51) Int. Cl.
    *F16K 5/06* (2006.01)
    *F16K 37/00* (2006.01)

(58) Field of Classification Search
    USPC .......................................................... 137/797
    See application file for complete search history.

(56) References Cited

U.S. PATENT DOCUMENTS

| | | | | |
|---|---|---|---|---|
| 4,085,770 A * | 4/1978 | Woronowicz | ......... | F16K 5/0647 137/238 |
| 4,093,180 A * | 6/1978 | Strabala | ................ | F16K 31/535 251/248 |
| 4,141,538 A * | 2/1979 | Bake | ....................... | F16K 27/06 251/315.14 |
| 4,253,640 A * | 3/1981 | Priese | ................ | F16K 31/1635 251/161 |
| 4,497,344 A * | 2/1985 | Kisiel | .................. | F16K 5/0647 137/368 |
| 4,616,528 A * | 10/1986 | Malinski | ................ | F16K 31/05 192/150 |
| 4,638,650 A * | 1/1987 | Hafele | .................... | F16K 35/06 137/385 |
| 5,139,230 A * | 8/1992 | Lester | ................... | F16K 5/0647 251/285 |
| 5,154,395 A * | 10/1992 | Horvei | .................. | F16K 5/0647 251/161 |
| 5,178,185 A * | 1/1993 | Stehling | .................. | F16K 15/18 137/385 |
| 5,259,589 A * | 11/1993 | Posner | .................. | F16K 5/0647 251/285 |
| 5,329,959 A * | 7/1994 | Owen | ..................... | F16K 35/06 137/315.17 |
| 5,931,444 A | 8/1999 | Chronister | | |
| 6,042,083 A * | 3/2000 | Lee | ......................... | F16K 31/60 251/161 |
| 6,240,946 B1 | 6/2001 | Beasley | | |
| 8,465,001 B2 * | 6/2013 | Witkowski | ........... | F16K 5/0442 251/89 |
| 2003/0034465 A1 | 2/2003 | Adams et al. | | |
| 2014/0083510 A1 | 3/2014 | Blieske et al. | | |
| 2014/0130884 A1 | 5/2014 | Sanders et al. | | |
| 2015/0034854 A1 * | 2/2015 | Gutmann | ............. | F16K 15/026 251/250.5 |
| 2016/0146355 A1 | 5/2016 | Anderson et al. | | |
| 2017/0138504 A1 | 5/2017 | Hoots et al. | | |
| 2018/0003304 A1 | 1/2018 | Kindersley et al. | | |

OTHER PUBLICATIONS

PCTUS1932971, Written Opinion and ISR by ISA/US, dated Aug. 1, 2019.

Fynan, Michael, "Start-up Experiences with Operation & Maintenance of Motor Operated Valves in a Delayed Coker," Coking.com Safety Seminar, Houston, Texas, Apr. 18-21, 2005.

* cited by examiner

COKER SWITCH VALVE OPERATING SYSTEM AND METHOD

CROSS REFERENCE TO RELATED APPLICATIONS

This application claims the benefit of and priority to U.S. Provisional Application Ser. No. 62/673,581 and U.S. Provisional Application Ser. No. 62/673,703, both filed May 18, 2018, the disclosures of which are fully incorporated herein by reference.

BACKGROUND

In delayed coking systems such as S1 shown in FIG. 1, a coker switch valve (CSV) V1 is often used to divert a flow F1 of heavy oil to or from coke drum A from or to coke drum B and/or to/from bypass BP. Typical temperatures of the process stream are over 200° C. and sometimes as high as 500° C., with typical times between switching coke drums of 16 to 24 hours. The heavy oil will turn into coke when held at these temperatures for several hours. Heavy oil often enters and forms coke in the valve cavity or seats, causing the CSV to seize. The valve components, including an actuator A1, are generally designed to withstand exposure to high temperatures.

The known CSVs typically have a stem coupling designed to protect against over-torqueing of the stem, to protect the components of actuator, and to protect against an unintentional switch to bypass where the heavy oil is recirculated to the heater. In the event the valve seizes and too much torque is applied to the stem, the valve V1 and/or the actuator A1 might be damaged. This is often avoided in conventional CSVs by using a shear pin linkage between the actuator and the valve stem, so that the pins will shear before the valve is damaged. However, the actuator A1 remains functional and will continue to turn. In many systems, the actuator A1 will continue to misreport the position of the valve V1 corresponding to the movement of the actuator A1 rather than the true position of the valve V1.

Similarly, CSVs often use locking pins to prevent inadvertently switching to bypass, and for locking the valve in position to divert the heavy oil to a particular drum. However, such systems are not known to provide a positive locking mechanism in the bypass mode, and it is still possible to inadvertently switch the feed to an open drum being serviced, creating a fire hazard.

The industry needs better ways to operate the switch valve that address one or both of these drawbacks.

SUMMARY

Applicant has found that the true position of a delayed coker switching valve can be indicated regardless of the status of the shear pins by mounting an indicator rod directly on the top of the valve stem, and connecting the indicator rod to a transverse pointer above the actuator. Applicant has also found that by using a system of three locking pins and a locking plate with two lobes in an annular track configuration, one pin can be used to prevent an inadvertent switch to bypass, and the other two can be used to lock the position of the valve in any alignment position, including bypass as well as to either drum A or drum B.

In one aspect, the present invention provides embodiments directed to an operating system for selectively rotating a valve stem of a coker switch valve into alignment positions for the valve to direct a stream of heavy oil to a first coke drum, a second coke drum, and a bypass. The system comprises: an actuator releasably engaging a stem adaptor for rotation about an axis of the valve stem; a shear pin linkage between the stem adaptor and a locking plate to rotate the drive plate in response to rotation of the stem adaptor by the actuator; the locking plate releasably engaging the valve stem to rotate the valve stem in response to rotation of the locking plate; and an indicator comprising a coaxial rod attached to the valve stem at a first end and attached to a transverse pointer at an opposite end of the rod extending through the actuator, wherein the rod and the pointer are rotated by the valve stem independently of the actuator.

In another aspect, the present invention provides embodiments direct to a method of operating the system just described to selectively rotate the valve stem of the coker switch valve into alignment positions for the valve to direct the stream of heavy oil to the first coke drum, the second coke drum, and the bypass, comprising the steps of (a) operating the actuator to rotate the valve stem adaptor; and (b) reading the indicator to confirm rotation of the valve in (a).

In another aspect, the present invention provides embodiments directed to an operating system for selectively rotating a valve stem of a coker switch valve into alignment positions for the valve to direct a stream of heavy oil to a first coke drum, a second coke drum, and a bypass. The system comprises: an actuator releasably engaging a stem adaptor for rotation about a central axis of the valve stem; a shear pin linkage between the stem adaptor and a locking plate to rotate the locking plate in response to rotation of the stem adaptor by the actuator; the locking plate releasably engaging the valve stem to rotate the valve stem in response to rotation of the locking plate; a mounting flange spool having a lower flange fixedly attached to a bonnet of the valve and an upper flange; diametrically opposing first and second lobes formed on the locking plate and extending outwardly to define an annular track adjacent the upper flange as a path of rotation of the lobes about the axis; a plurality of locking pins releasably securable to the upper flange at a like plurality of stop positions and extendable into the annular track to limit movement of the lobes in the annular track, thereby limiting rotation of the valve stem; wherein, when the valve stem is in an alignment position for the first or second coke drum, disengagement of the first and second ones of the locking pins from respective first and second stop positions and engagement of the third one of the locking pins allows rotation of the valve stem between the first and second coke drum alignment positions and prevents the valve stem from rotating to the bypass alignment position; and wherein, when the valve stem is in alignment position for the bypass, engagement of the first and second ones of the locking pins in the first and second stop positions, respectively, prevents rotation of the valve stem out of the bypass alignment position.

In another aspect, the present invention provides embodiments directed to a method of operating the system just described to selectively rotate the valve stem of the coker switch valve into alignment positions for the valve to direct the stream of heavy oil to the first coke drum, the second coke drum, and the bypass, comprising the steps of: (a) disengaging at least two of the locking pins from the stop positions to enable switching the valve from one alignment position to another; and (b) after the switching of the valve in step (a), engaging at least two of the pins to lock the valve into the resulting alignment position.

DETAILED DESCRIPTION

Figure 1:
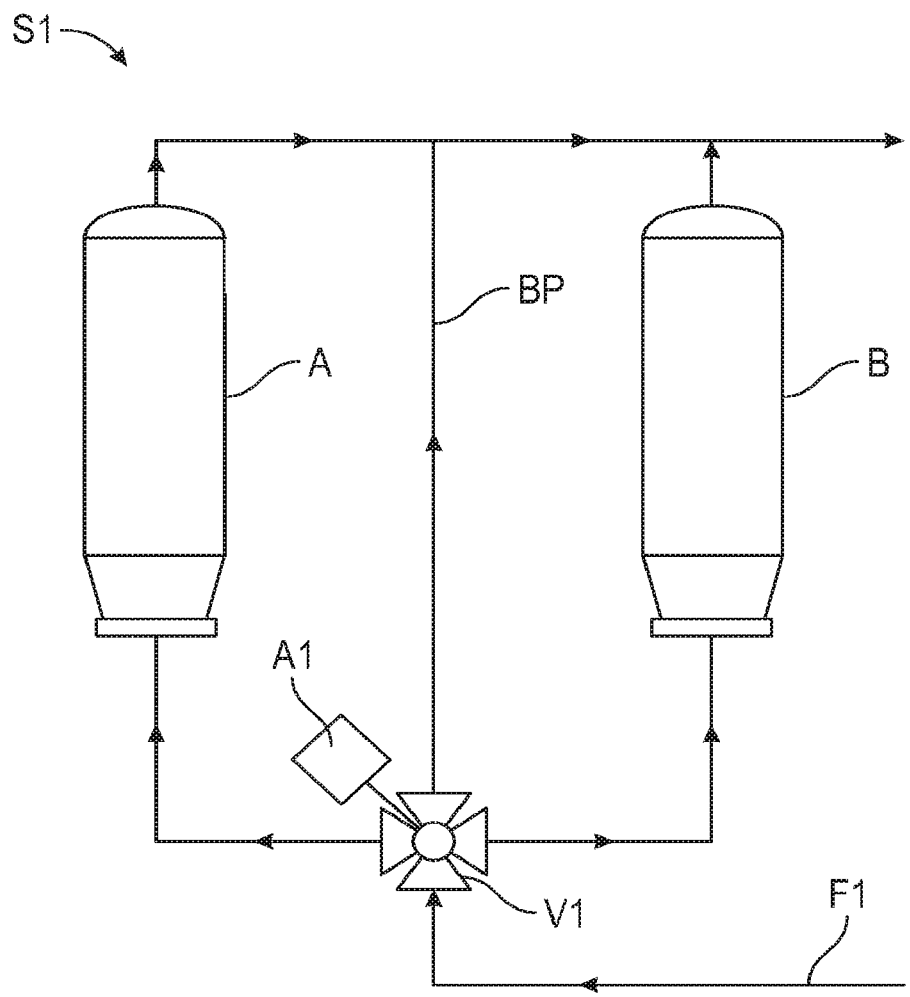
FIG. 1 is a simplified schematic flow diagram of a typical prior art delayed coking process.

Disclosed herein are top works and an actuator that can be used to operate a multiport valve comprising a valve body comprising a flow path between a body inlet coaxial to a first axis and a plurality of body outlets each oriented at an angle transverse to the first axis; a spherical flow control element disposed within the valve body comprising a ball inlet having a ball inlet area radially arranged about the first axis, and a ball outlet having a ball outlet area radially arranged at the transverse angle to the first axis, the flow control element rotatable about the first axis to selectively align the ball outlet with each of the plurality of body outlets. A valve stem is engaged with or preferably integral to a spherical flow control element (a ball), the valve stem protruding through a corresponding valve stem opening in the bonnet coaxial with a rotational axis of the ball and sealingly engaged with the valve body. In any embodiment, the valve stem can be engaged with a locking plate disposed within a mounting flange spool attached to a portion of the valve body, e.g., the bonnet. The mounting flange spool comprises a first inner surface corresponding to and proximate to a first outer surface of the locking plate, the first inner surface comprising a plurality of locking holes disposed therethrough in stop positions. A corresponding number of locking pins are insertable into the locking holes. The locking holes are arranged about the first inner surface such that two locking pins disposed through two of the locking holes engage respective portions of the locking plate to prevent rotation of the ball out of a first position.

In any embodiment, the mounting flange spool may comprise a second inner surface oriented perpendicular to the first inner surface and further comprising at least one transverse locking hole disposed therethrough and a corresponding transverse locking pin insertable into the transverse locking hole, wherein the first inner surface is parallel to the first outer surface of the locking plate, and wherein the second inner surface is concentric with a second outer surface of the locking plate; the transverse locking hole radially arranged about the second inner surface such that a locking pin disposed through a first one of the locking holes and the transverse locking pin disposed through the transverse locking hole engages the locking plate to prevent rotation of the ball out of a second position.

In any embodiment, the valve stem can be engaged with a locking plate disposed within a mounting flange spool attached to a portion of the valve body, e.g., the bonnet. A flange of a stem adaptor disposed parallel and proximate to the locking plate can be engaged with a valve actuator attached to the mounting flange spool, via a plurality of shear pins disposed through a hole in the stem adaptor flange and a corresponding opening in the locking plate. The shear pins are dimensioned and arranged such that preventing of the locking plate from movement, e.g., in the case of a seized valve, followed by turning of the stem adaptor flange via the actuator results destruction of the shear pins with subsequent breaking of the engagement between the stem adaptor flange and the locking plate.

In any embodiment, the valve stem may be engaged with a valve actuator attached to the valve body, e.g., via the mounting flange spool. The valve stem may further comprise a position indicator extending through a top plate of the valve actuator into a surrounding environment external to the valve actuator, wherein the position indicator is not engaged with the valve actuator. The position indicator can comprise a pointing device which indicates the flow path between the body inlet and body outlet of the valve, and which always shows the true orientation of the valve flow path regardless of any indication provided by the actuator.

In any embodiment, the valve actuator may be engaged with the valve stem through one or more removable drive keys comprising a portion located in a surrounding environment external to the valve actuator and being removable into the surrounding environment, wherein removal of the drive key pins disengages the valve actuator from the valve stem.

The valve may, in any embodiment, be a 4-way coker switch valve (CSV) according to the instant disclosure which is suitable to handle asphalt-like materials at high temperature. The fluid entry is from the bottom of the valve body through an inlet and then flows through a fluid flow passage in a flow control element, sometimes also called a ball, and exits through a transverse outlet port aligned with one of three side exits radially spaced in the valve body at equal intervals, e.g., an exit to drum A, to drum B, and to bypass, in a typical delayed coker process arrangement.

In one aspect of the invention, embodiments provide a CSV operating system for selectively rotating a valve stem of the valve into position for first and second coke drums and bypass. The operating system comprises an actuator releasably engaging a stem adaptor for rotation about an axis of the valve stem, and a shear pin linkage between the stem adaptor and a locking plate to rotate the drive plate in response to rotation of the stem adaptor by the actuator. The locking plate releasably engaging the valve stem to rotate the valve stem in response to rotation of the locking plate. An indicator comprises a coaxial rod attached to the valve stem at a first end, and attached to a transverse pointer at an opposite end of the rod extending through the actuator, wherein the rod and the pointer are rotated by the valve stem independently of the actuator.

In any embodiment of the CSV operating system, the shear pin linkage is designed to shear the pins if torque applied to the locking plate exceeds a predetermined level, to avoid damaging the valve in the event of a valve seizure and/or to avoid damaging the actuator.

In any embodiment of the CSV operating system, proximity sensors can be provided to sense a proximity of the pointer in the first coke drum alignment position, the second coke drum alignment position, and the bypass alignment position. If desired, the system can include a scribe line on the valve stem and scribe lines on a gland flange of the valve corresponding to the first coke drum alignment position, the second coke drum alignment position, and the bypass alignment position.

In another aspect, embodiments of the present invention provide a method of operating the system to selectively rotate the valve stem of the coker switch valve into alignment positions for the valve to direct the stream of heavy oil to the first coke drum, the second coke drum, and the bypass. The method comprises the steps of (a) operating the actuator to rotate the valve stem adaptor, and (b) reading the indicator to confirm rotation of the valve in (a). For example, if torque applied to the locking plate exceeds a predetermined threshold, shearing the shear pin linkage, the indicator continues to indicate a true position of the valve stem.

In any embodiment, the CSV operating system can further comprise a mounting flange spool having a lower flange fixedly attached to a bonnet of the valve and an upper flange, diametrically opposing first and second lobes formed on the locking plate and extending outwardly to define an annular track adjacent the upper flange as a path of rotation of the lobes about the axis, and a plurality of locking pins releasably securable to the upper flange at a like plurality of stop positions and extendable into the annular track to limit movement of the lobes in the annular track, thereby limiting rotation of the valve stem. In any embodiment, the locking pins can comprise at least one axially oriented pin and at least one transversely oriented pin, preferably two axially oriented pins and one transversely oriented pin, wherein the locking pins cooperate with the lobes to hold the valve stem in the selected alignment position of the flow control element. Preferably, one locking pin is secured at a first stop position to limit movement of one of said lobes in a clockwise direction and another locking pin is secured at a second stop position to limit movement of one of said lobes in a counterclockwise direction, thereby locking the valve stem in the selected alignment position.

In any embodiment, the CSV operating system can further comprise first and second ones of the locking pins in respective first and second stop positions prevent the lobes from passing between the first coke drum alignment position and the second coke drum alignment position, and wherein a third one of the locking pins in a third stop position prevents the lobes from entering the bypass alignment position, whereby disengagement of the first and second locking pins from the respective stop positions permits switching of the valve between the first and second coke drum positions while engagement of the third locking pin in the third stop position prevents switching to the bypass position.

Preferably, engagement of the first and third locking pins in the respective first and third stop positions locks the lobes in the first coke drum position, engagement of the second and third locking pins in the respective second and third stop positions locks the lobes in the second coke drum position, and engagement of the first and second locking pins in the respective first and second stop positions locks the lobes in the bypass alignment position.

In another aspect, embodiments of the present invention provide an operating system for selectively rotating a valve stem of a coker switch valve into alignment positions for the valve to direct a stream of heavy oil to a first coke drum, a second coke drum, and a bypass. This operating system comprises: an actuator releasably engaging a stem adaptor for rotation about a central axis of the valve stem; and a shear pin linkage between the stem adaptor and a locking plate to rotate the locking plate in response to rotation of the stem adaptor by the actuator. The locking plate releasably engages the valve stem to rotate the valve stem in response to rotation of the locking plate. A mounting flange spool has a lower flange fixedly attached to a bonnet of the valve and an upper flange. diametrically opposing first and second lobes formed on the locking plate extend outwardly to define an annular track adjacent the upper flange as a path of rotation of the lobes about the axis.

A plurality of locking pins is releasably securable to the upper flange at a like plurality of stop positions and extendable into the annular track to limit movement of the lobes in the annular track, thereby limiting rotation of the valve stem. When the valve stem is in an alignment position for the first or second coke drum, disengagement of the first and second ones of the locking pins from respective first and second stop positions and engagement of the third one of the locking pins allows rotation of the valve stem between the first and second coke drum alignment positions and prevents the valve stem from rotating to the bypass alignment position. When the valve stem is in alignment position for the bypass, engagement of the first and second ones of the locking pins in the first and second stop positions, respectively, prevents rotation of the valve stem out of the bypass alignment position.

Preferably, when the valve stem is in alignment position for the first coke drum, engagement of the first and third ones of the locking pins in the first and third stop positions, respectively, prevents rotation of the valve stem out of the first coke drum alignment position; and when the valve stem is in alignment position for the second coke drum, engagement of the second and third ones of the locking pins in the second and third stop positions, respectively, prevents rotation of the valve stem out of the second coke drum alignment position.

In any embodiment, the second stop position can be located about 30 degrees clockwise from the first stop position, and the third stop position can be located about 30 degrees counterclockwise from the first stop position. Preferably, the lobes are dimensioned to match the spaces between the first and second locking pins engaged in the first and second stop positions and between the first and third locking pins engaged in the first and third stop positions. In a preferred embodiment, the first and second locking pins for switching between drum A and drum B can be axially oriented and the third locking pin, the bypass lockout pin, can be oriented transversely. This arrangement helps identify the appropriate pins for the operator.

In any embodiment, the second stop position can be located about 30 degrees clockwise from the first stop position, and the third stop position about 30 degrees counterclockwise from the first stop position. Preferably, the lobes are dimensioned to match the spaces between the first and second locking pins engaged in the first and second stop positions, and between the first and third locking pins engaged in the first and third stop positions, and the first and second locking pins can axially oriented and the third locking pin oriented transversely.

In a further aspect, embodiments of the present invention provide a method of operating the system just described to selectively rotate the valve stem of the coker switch valve into alignment positions for the valve to direct the stream of heavy oil to the first coke drum, the second coke drum, and the bypass. The method comprises the steps of (a) disengaging at least two of the locking pins from the stop positions to enable switching the valve from one alignment position to another; and (b) after the switching of the valve in step (a), engaging at least two of the pins to lock the valve into the resulting alignment position. Preferably, in step (a), one of the locking pins is engaged to prevent the valve from switching into an unintended alignment position, e.g., bypass position during a switch between the coke drums.

The method preferably comprises aligning the valve stem in position to direct the stream of heavy oil to the first coke drum, and engaging the first and third locking pins in the first and third stop positions, respectively, to prevent rotation of the valve stem out of the first coke drum alignment position; and aligning the valve stem in position to direct the stream of heavy oil to the second coke drum, and engaging of the second and third locking pins in the second and third stop positions, respectively, to prevent rotation of the valve stem out of the second coke drum alignment.

In any embodiment, the method can comprise locating the second stop position about 30 degrees clockwise from the first stop position, and locating the third stop position about 30 degrees counterclockwise from the first stop position. The lobes can be dimensioned to match the spaces between the first and second locking pins engaged in the first and second stop positions, and between the first and third locking pins engaged in the first and third stop positions.

Preferably, the method comprises orienting the first and second locking pins axially and orienting the third locking pin, e.g., the bypass lockout pin, transversely.

Figure 2:
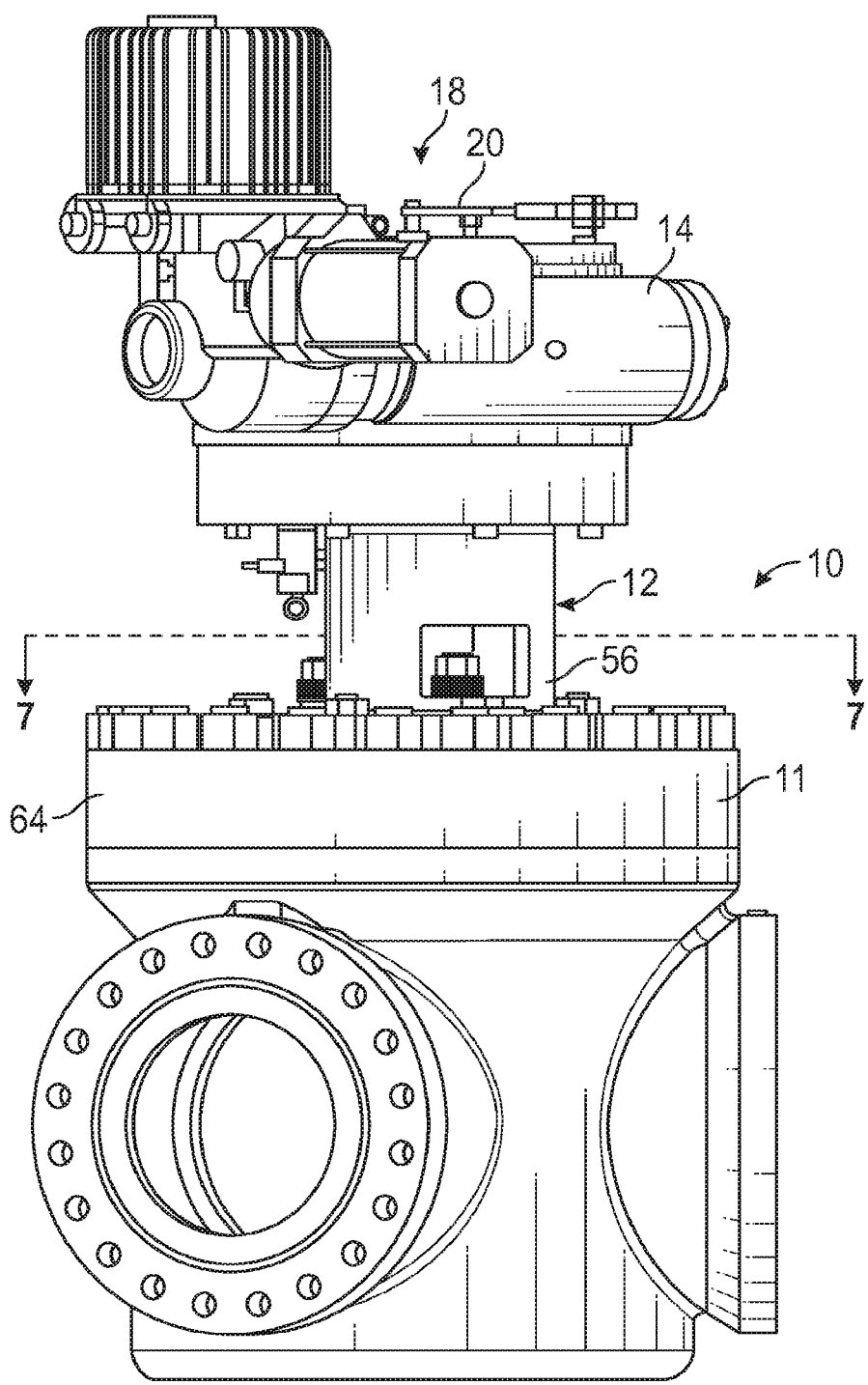
FIG. 2 is a side view of a multiport valve according to embodiments of the present invention.
Figure 3:
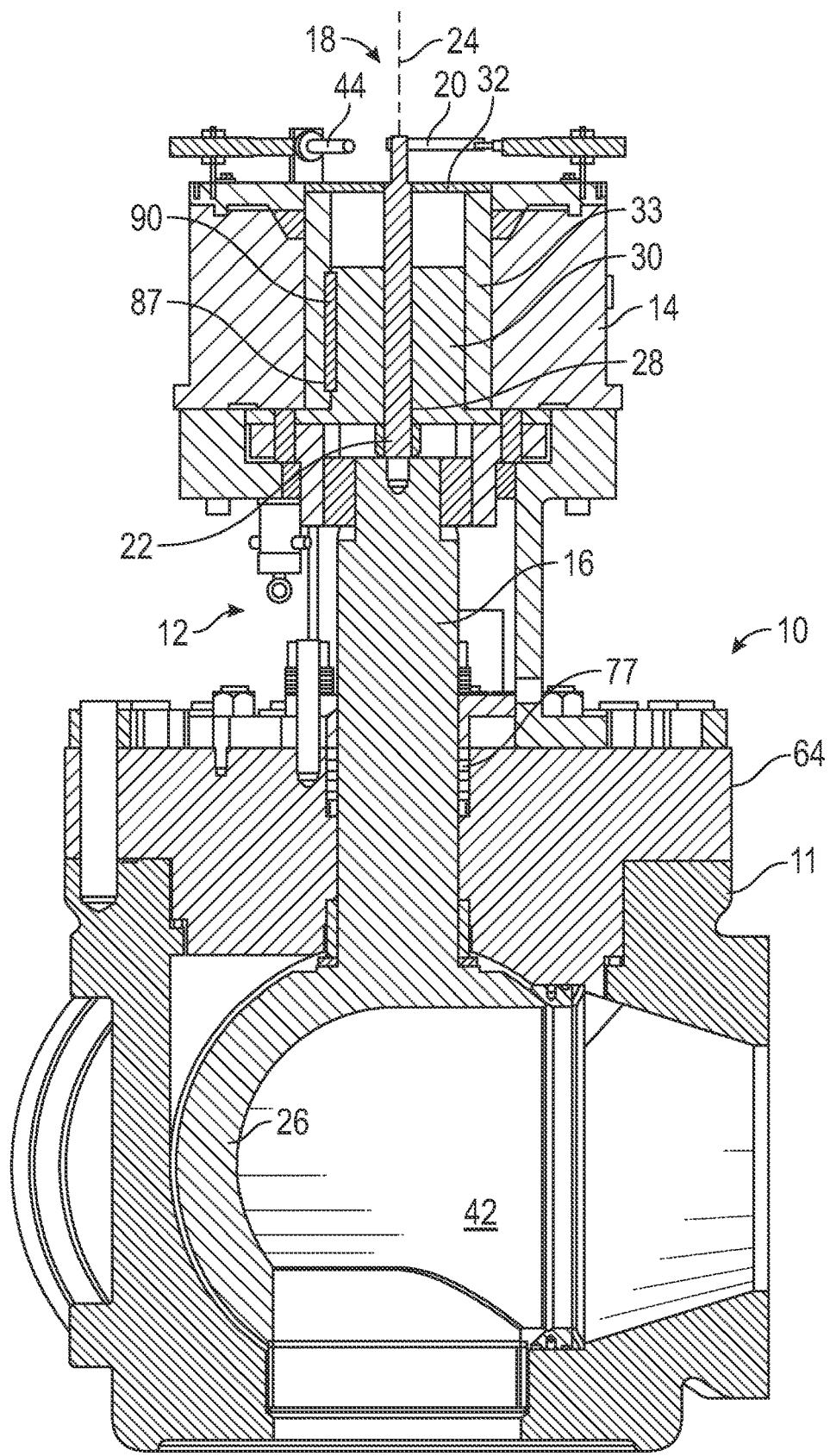
FIG. 3 is a side sectional view of the multiport valve of FIG. 2.
Figure 4:
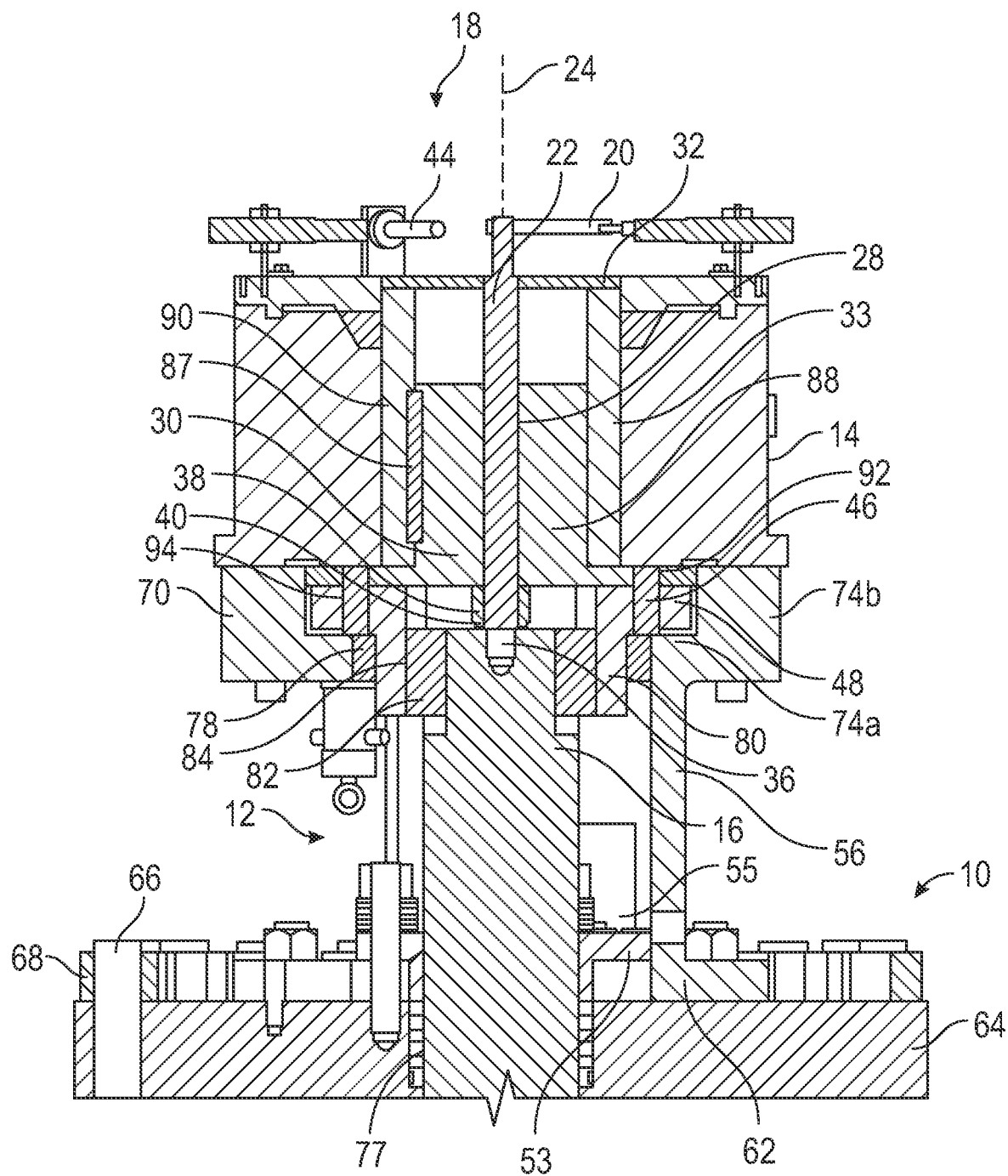
FIG. 4 is an enlarged side sectional view of the top works and actuator of the valve of FIGS. 2-3.
Figure 5:
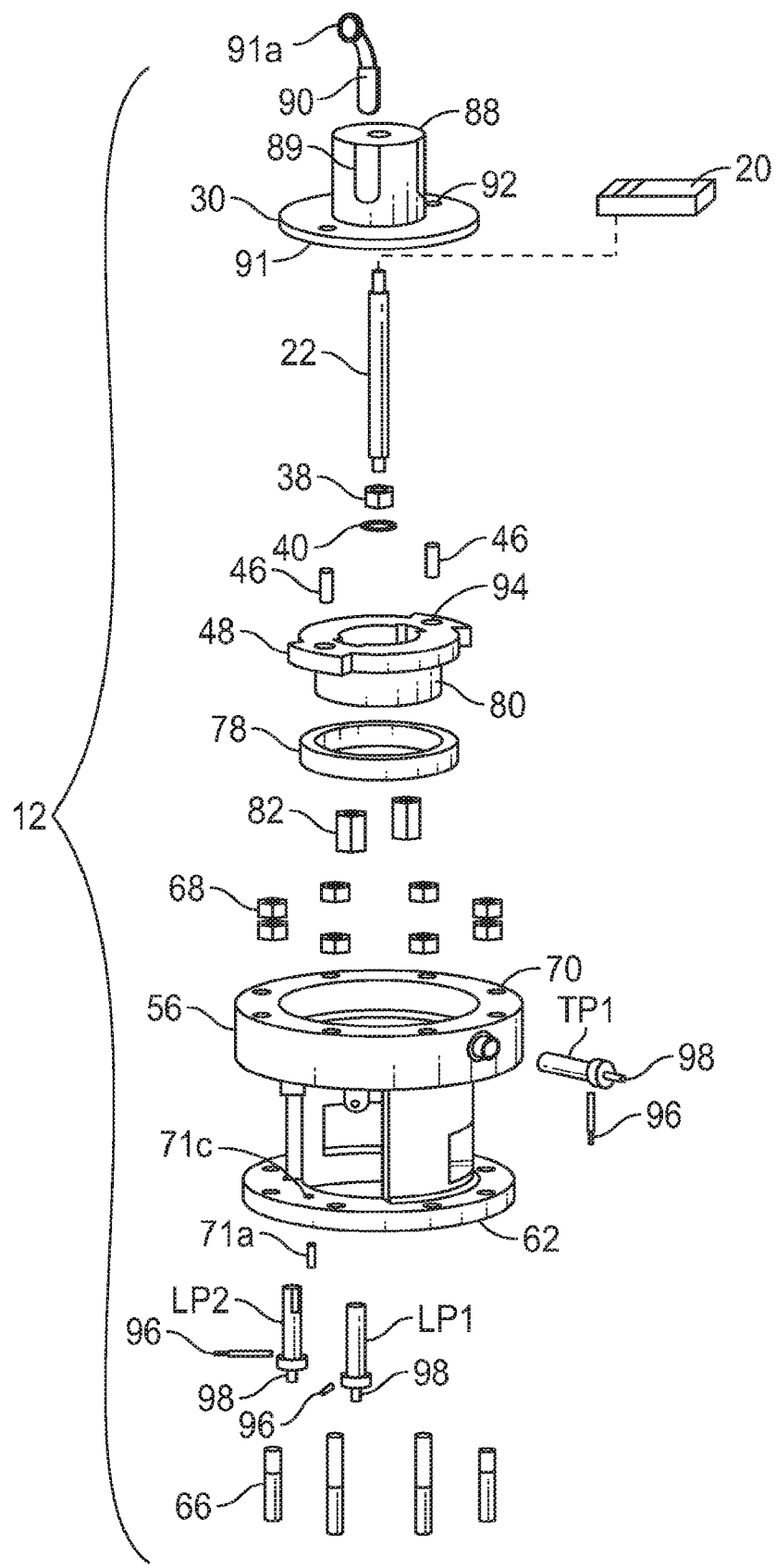
FIG. 5 is an exploded view of the top works in the valve of FIGS. 2-4.

With reference to the drawings in which like numbers and letters refer to like parts, FIG. 2 shows a side view, and FIG. 3 shows a side sectional view, of a CSV 10 having a valve body 11, top works 12, actuator 14, valve stem 16, and valve position indicator 18, according to embodiments of the instant disclosure. FIG. 4 shows an enlarged view, and FIG. 5 shows an exploded view, of the top works 12.

Figure 6:
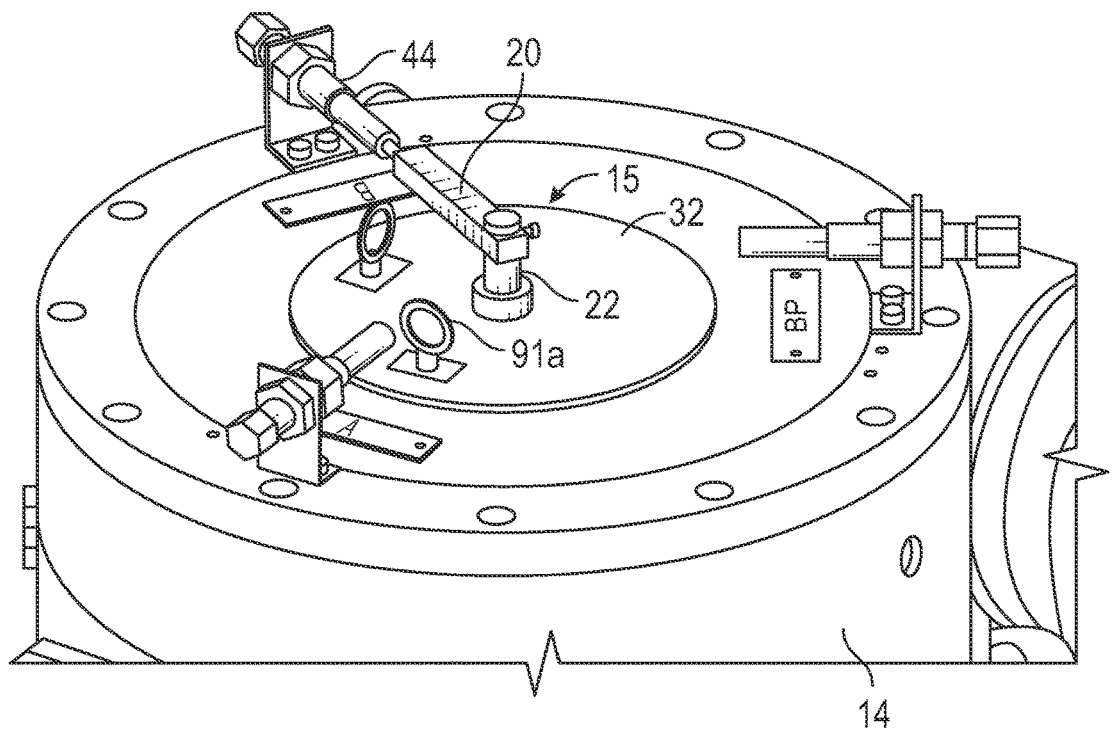
FIG. 6 is a perspective view of the actuator from the valve of FIGS. 2-5 as seen from above.
Figure 7:
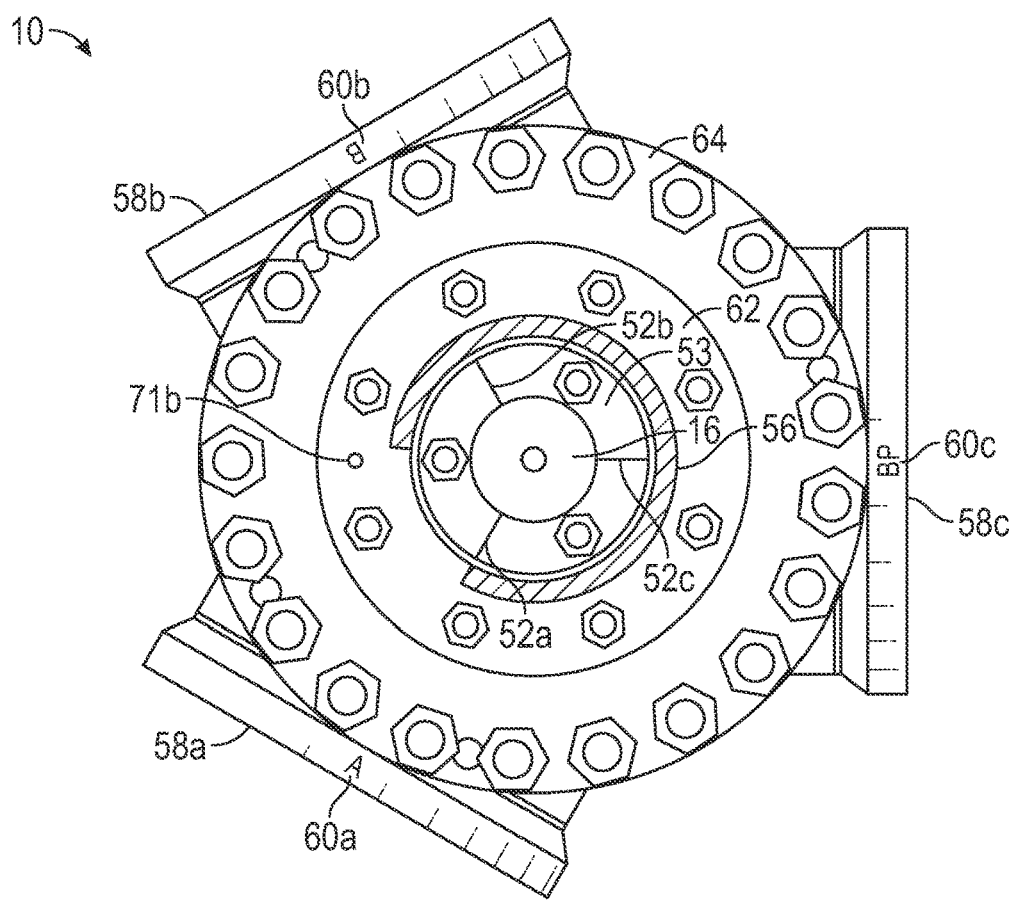
FIG. 7 is a view of the valve of FIG. 2 as seen along the view lines 7-7 with the mounting flange spool removed.

FIG. 6 shows the valve position indicator 18 according to embodiments of the present invention. FIG. 7 shows the outlet ports 58a, 58b, 58c and their respective labels 60a, 60b, 60c for the drum A, drum B, and bypass (BP). The valve 10 is shown in the present drawings without purge and drain connections, pad eyes, etc., for the purposes of simplicity and clarity.

In any embodiment, as best seen in FIGS. 3-6, the valve stem 16 may be engaged with an indicator 18 comprising a transverse pointer 20 on an upper end of a rod 22 aligned with the axis 24 of rotation of the flow control element 26, and extending from the valve stem 16 through a bore 28 in a stem adaptor 30 and a cover plate 32 for drive member 33 of the actuator 14. The indicator rod 22 has a profile at its lower end matching a corresponding slot or bore 36 disposed into the top of the valve stem 16, e.g., bore 36 can be threaded to engage the rod 22, and a nut 38 and wedge lock washer 40 can be used to lock the rod 22 into orientation with the outlet port 42 of the flow control element 26.

Importantly, the indicator 18 is not engaged with, and rotates independently of, the actuator 14, cover plate 32, drive member 33, and stem adaptor 30. Thus, rotation of the indicator rod 22 is dependent on the valve stem 28 only, and not the actuator 14 or any actuator components. The pointer 20 attached to the upper end of the rod 22 is located outside the actuator 14 to indicate the position of the outlet port 42 of the ball 26 independently of the actuator 14. As best seen in FIG. 6, the location of the pointer 20 is often detected by proximity sensors 44, which can correspond to the drum A alignment position, the drum B alignment position, and the bypass mode alignment position, of the ball 26, and a signal transmitted to an indicator and/or recording device (not shown), e.g., in a remote location such as a process control room. This is a safety feature which assists an operator to obtain a correct determination of the alignment position of outlet port 42 in the event of a malfunction in the actuator 14, or another malfunction which disengages the actuator 14 from the valve stem 16, e.g., shearing of the shear pins 46 that engage the stem adaptor 30 with the locking plate 48.

Figure 8:
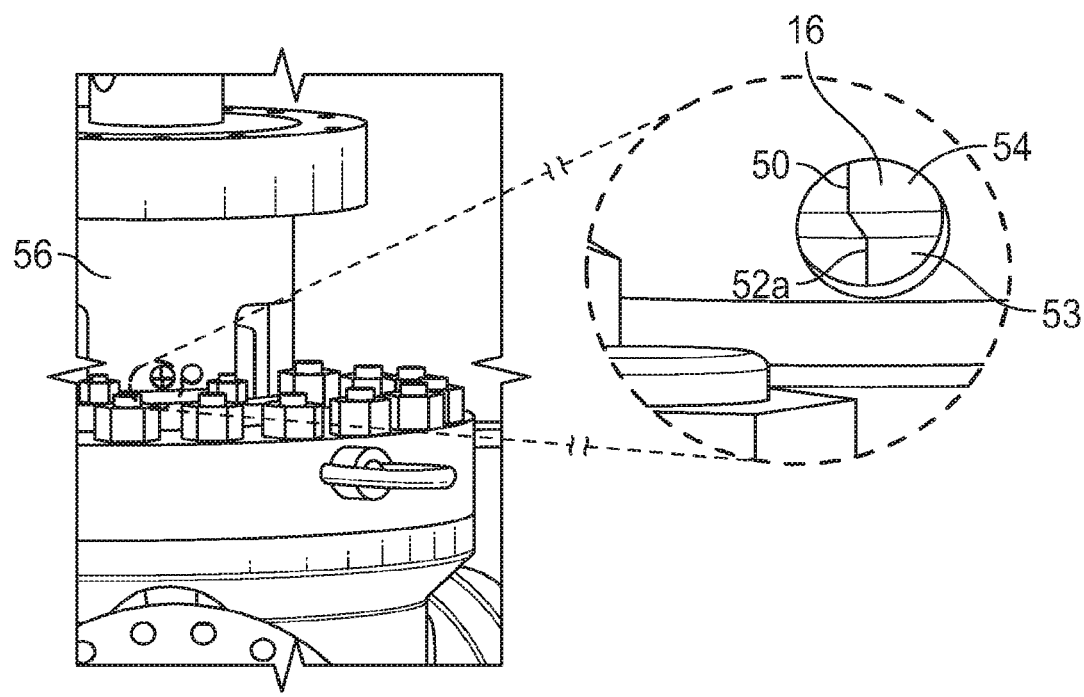
FIG. 8 shows an enlarged view of scribe lines on the valve stem and gland flange of the valve of FIGS. 2-7.
Figure 9:
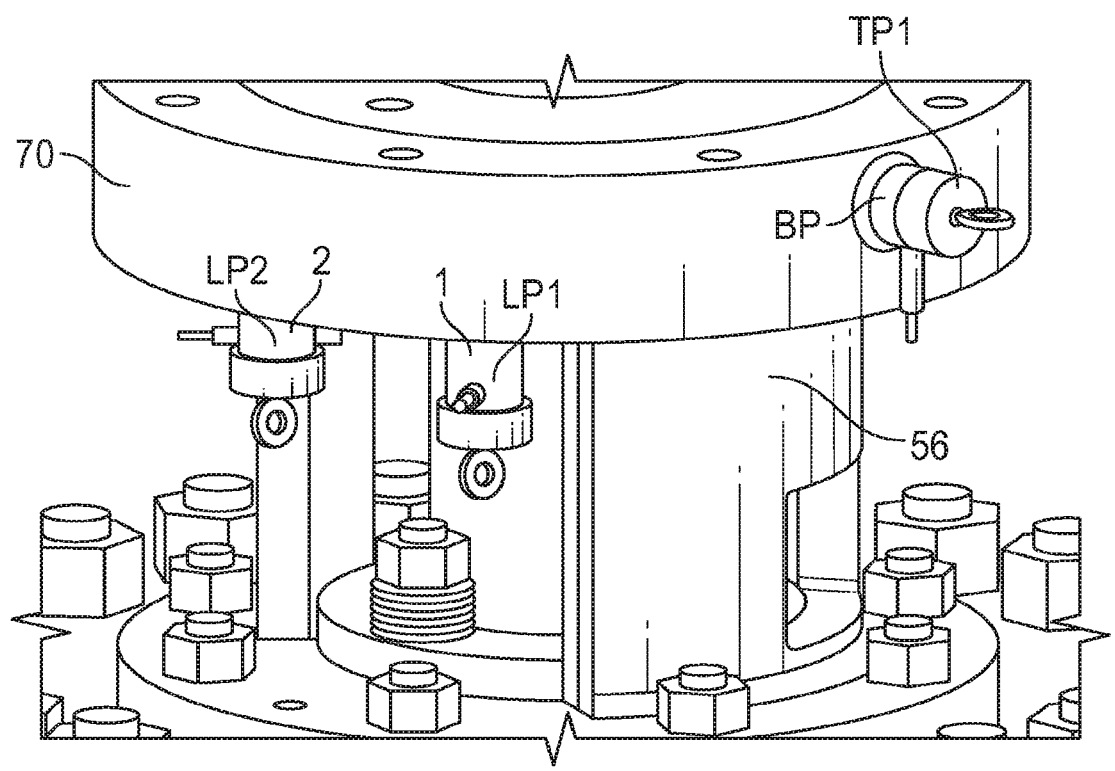
FIG. 9 shows the locking pins engaged in the mounting flange spool of the valve of FIGS. 2-8.

If desired, the alignment position of the ball 26 can also be ascertained by means of scribe line 50 on the valve stem 16 and scribe lines 52a, 52b, 52c provided on the gland flange 53, as best seen in FIGS. 7 and 8. There is often a hole 54 (FIG. 8) or window 55 (FIG. 4) provided in the mounting flange spool 56 where needed. The scribe line 50 on the stem 16 corresponds to the position of the ball 26, and the scribe lines 52a, 52b, 52c correspond to the outlet ports 58a to drum A, 58b to drum B, and 58c to bypass, for example. The scribe lines 50 and 52a, 52b, 52c can be used to install the pointer 18 in the correct position, or to check or confirm alignment of the pointer 18. Labels or embossments 60a ("A"), 60b ("B"), 60c ("BP") can also be provided on the respective ports 58a, 58b, 58c.

As best seen in FIGS. 2-5, top works 12 comprises the mounting flange spool 56 having a lower flange 62 fixedly attached to the bonnet 64 of the valve 10, e.g., by means of studs 66, nuts 68, and an upper flange 70. In this regard, an alignment pin 71a (FIG. 5) is used in holes 71b (FIG. 7), 71c (FIG. 5) in the bonnet 64 and the lower flange 62, respectively, to orient the spool 56 with the valve 10.

Figure 10:
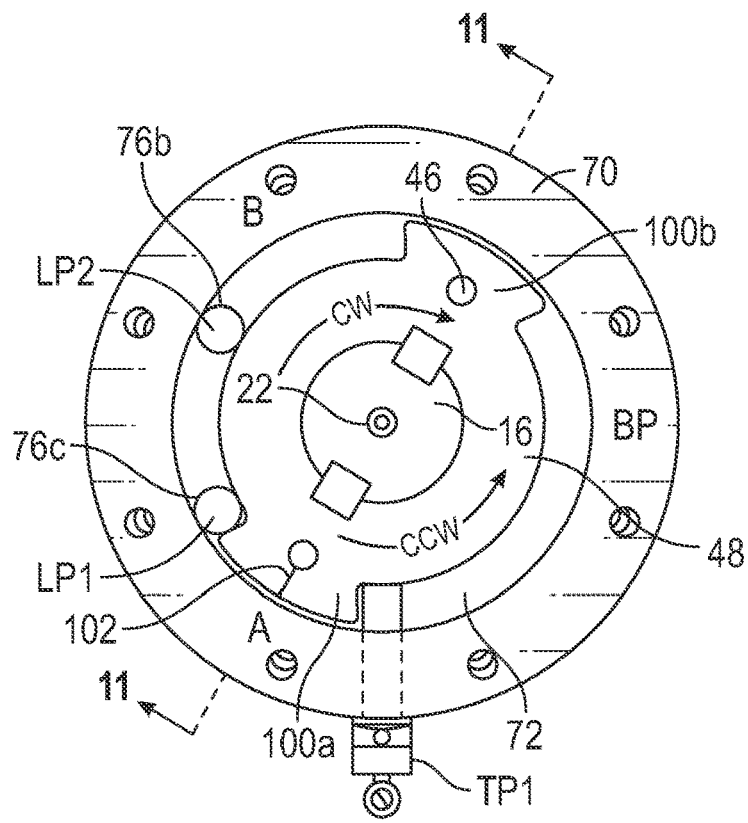
FIG. 10 is an inner view of the locking plate and locking pins as seen along the view lines 10-10 of FIG. 4 showing the valve aligned in position for feed to drum A.
Figure 11:
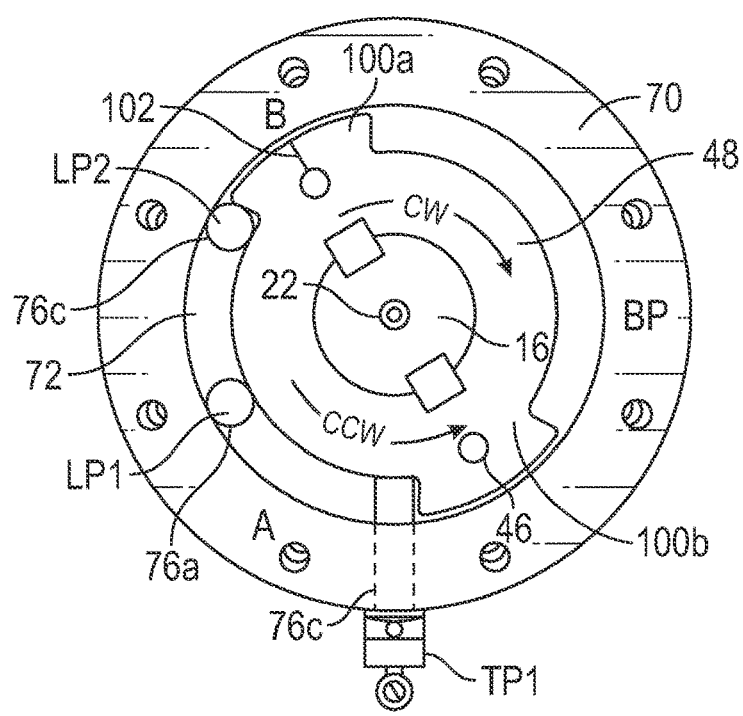
FIG. 11 is an inner view of the locking plate and pins as seen along the view lines 10-10 of FIG. 4 showing the valve aligned in position for feed to drum B.
Figure 12:
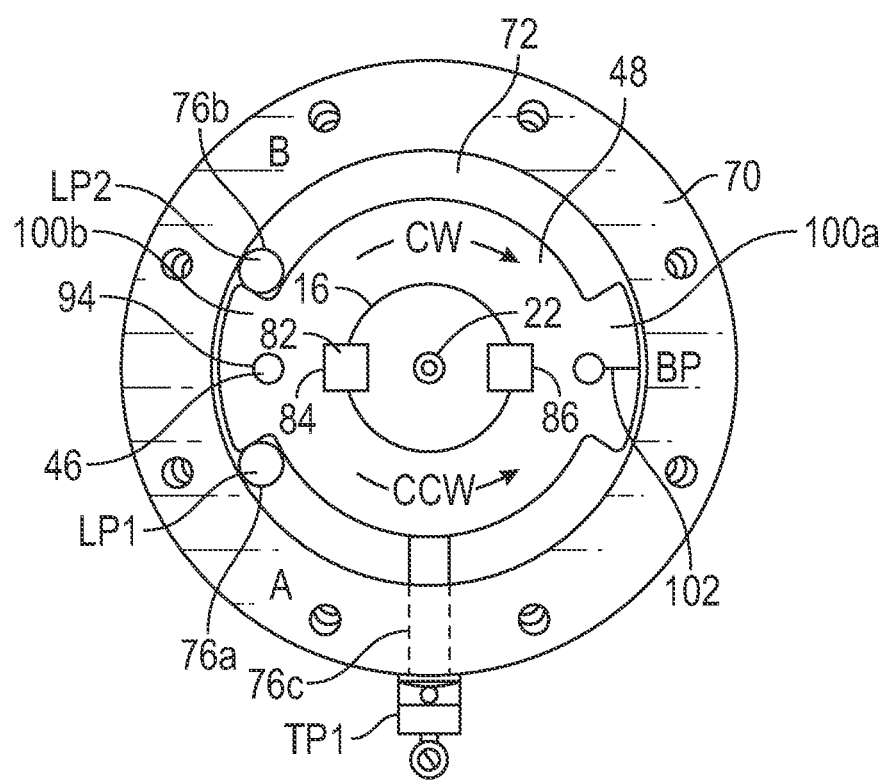
FIG. 12 is an inner view of the locking plate and pins as seen along the view lines 10-10 of FIG. 4 showing the valve aligned in position for bypass mode.

Referring back to FIGS. 4-5, bushing 78 is disposed in the upper flange 70 to rotatably receive a lower cylindrical portion 80 of the locking plate 48. The stem 16 protrudes through a packing gland 77 formed in the bonnet 64 into the flange mounting spool. As best seen in FIGS. 10-12, keys 82 are received in the respective keyways 84 formed in the ID of locking plate 48 and key seats 86 formed on the outside of the stem 16. Similarly, keyway 87 can also be provided between the ID of rotating drive member 33 of the actuator 14 and the OD of a cylindrical part 88 of stem adaptor 30 in which key seats 89 can be formed. Keys 90 are received in the keyways 87. If desired, keys 90 can be provided with an eye bolt 91a to allow insertion/removal through the cover plate 32, as seen in FIG. 6.

As mentioned above, shear pins 46 received in corresponding bores 92 of a transverse plate 91 of the stem adaptor 30 and bores 94 in the locking plate 48 provide a shear pin linkage for mutual rotation about the axis 24. These pins 46 are designed to shear off at a predetermined torque to avoid damaging the valve 10 or the actuator 14, e.g., in the event of a valve malfunction or operator error.

Thus, in any embodiment, the valve 10 may be connected to the actuator 14 by the shear pin linkage comprising two parallel plates, e.g., the locking plate 48 secured to the top of the valve stem 16 and stem adaptor plate 91 secured or otherwise attached to the drive mechanism of the actuator, and the pins 46 in the respective bores 94, 92. In any embodiment, the only connection between the valve stem 16 and the actuator 14 may be via the shear pins 46.

The shear pins are dimensioned such that if the actuator 14 is engaged when the locking plate 48 is locked via the locking pins LP1, LP2, TP1, or the valve is seized up from coke or misaligned parts, the shear pins 46 break to disengage the actuator drive plate 91 from the locking plate 48, and thus disengage the actuator 14 from the valve stem 16, thereby preventing damage to the valve stem 16, the actuator 14, and/or other components of the valve 10. This arrangement provides an extra layer of safety and operability to embodiments of the instant disclosure.

As best seen in FIGS. 9-12, upper flange 70 outlines an annular track 72, e.g., on an upper surface of a lower plate 74a (FIG. 4) and adjacent to the ID surface of collar 74b (FIG. 4). The annular track 72 is defined by the path of lobes 100A, 100B formed on opposite sides of the locking plate 48, as it is rotated about the axis 24. The upper flange 70 of the mounting flange spool 56 has holes 76a, 76b, 76c at radial stop positions 1, 2, and BP to engage respective axial locking pins LP1, LP2, and transverse locking pin TP1. The locking pins LP1, LP2, TP1 can, if desired, be provided with quick releases 96 and eye bolts 98. The stop positions 1, 2, BP for the locking pins LP1, LP2, TP1 are placed so that they protrude into the annular track 72, such that the locking plate 48 can be prevented from movement in either rotational direction when the pins LP1, LP2, TP1 are engaged at their corresponding stop positions 1, 2, BP.

This is a safety feature which prevents the valve 10 from being inadvertently operated to switch the flow path if the actuator 14 and/or the stem adaptor 30 are inadvertently operated. For example, as seen in FIG. 10, engagement of locking pins LP1 and TP1 in stop positions 1 and BP on either side of lobe 100a locks the valve 10 into alignment position for drum A, as indicated by the scribe line 102. Similarly in FIG. 11, TP1 in stop position 1 prevents lobe 100b from moving clockwise, while LP2 in stop position BP stops lobe 100a from moving counterclockwise, keeping the valve 10 in alignment position B. Switching the valve 10 between drum A and drum B is enabled by disengaging LP1 and LP2; however, keeping TP1 engaged in stop position BP during the switch between drum A and drum B effectively prevents rotation to bypass position, since the lobes 100a, 100b cannot pass stop position BP.

Thus, switching to bypass is enabled by disengaging pin TP1 and the appropriate one of LP1 and LP2, depending on which drum is being switched to bypass. However, unlike the prior art, the present invention enables locking the valve 10 in the bypass mode by engaging pins LP1 and LP2 in stop positions 1 and 2 on either side of lobe 100b. Thus, in present embodiments of the invention, the ball 26 is selectively locked in any one of the three positions corresponding to each outlet port 58a, 58b, 58c, depending on which two of the locking pins LP1, LP2, TP1 are engaged into the corresponding stop positions 1, 2, BP. The engagement of the locking pins LP1, LP2, TP1 can thus prevent unintended movement of the ball 26 when engaged in the stop positions 1, 2, BP, whereas selective disengagement and engagement can define the available rotation for a desired switching, preventing the stem 16 from being inadvertently rotated into an undesired switch to an open drum or unready bypass.

EMBODIMENTS

Accordingly, the invention provides the following embodiments:

1. Coker switch valve operating system for selectively rotating a valve stem of the valve into position for first and second coke drums and bypass, comprising:

an actuator releasably engaging a stem adaptor for rotation about an axis of the valve stem;

a shear pin linkage between the stem adaptor and a locking plate to rotate the drive plate in response to rotation of the stem adaptor by the actuator;

the locking plate releasably engaging the valve stem to rotate the valve stem in response to rotation of the locking plate; and an indicator comprising a coaxial rod attached to the valve stem at a first end and attached to a transverse pointer at an opposite end of the rod extending through the actuator, wherein the rod and the pointer are rotated by the valve stem independently of the actuator.

2. The system of embodiment 1, wherein the shear pin linkage is designed to shear the pins if torque applied to the locking plate exceeds a predetermined level, to avoid damaging the valve in the event of a valve seizure and/or to avoid damaging the actuator.

3. The system of embodiment 1 or embodiment 2 further comprising proximity sensors to sense a proximity of the pointer in the first coke drum alignment position, the second coke drum alignment position, and the bypass alignment position.

4. The system of any of embodiments 1 to 3, further comprising a scribe line on the valve stem and scribe lines on a gland flange of the valve corresponding to the first coke drum alignment position, the second coke drum alignment position, and the bypass alignment position.

5. The system of any of embodiments 1 to 4, further comprising:

a mounting flange spool having a lower flange fixedly attached to a bonnet of the valve and an upper flange;

diametrically opposing first and second lobes formed on the locking plate and extending outwardly to define an annular track adjacent the upper flange as a path of rotation of the lobes about the axis;

a plurality of locking pins releasably securable to the upper flange at a like plurality of stop positions and extendable into the annular track to limit movement of the lobes in the annular track, thereby limiting rotation of the valve stem.

6. The system of embodiment 5, wherein the locking pins comprise at least one axially oriented pin and at least one transversely oriented pin, preferably two axially oriented pins and one transversely oriented pin, wherein the locking pins cooperate with the lobes to hold the valve stem in the selected alignment position of the flow control element, wherein one locking pin is secured at a first stop position to limit movement of one of said lobes in a clockwise direction and another locking pin is secured at a second stop position to limit movement of one of said lobes in a counterclockwise direction, thereby locking the valve stem in the selected alignment position.

7. The system of embodiment 5 or embodiment 6, wherein a first and second ones of the locking pins in respective first and second stop positions prevent the lobes from passing between the first coke drum alignment position and the second coke drum alignment position, and wherein a third one of the locking pins in a third stop position prevents the lobes from entering the bypass alignment position, whereby disengagement of the first and second locking pins from the respective stop positions permits switching of the valve between the first and second coke drum positions while engagement of the third locking pin in the third stop position prevents switching to the bypass position.
8. The system of embodiment 7 wherein engagement of the first and third locking pins in the respective first and third stop positions locks the lobes in the first coke drum position, engagement of the second and third locking pins in the respective second and third stop positions locks the lobes in the second coke drum position, and wherein engagement of the first and second locking pins in the respective first and second stop positions locks the lobes in the bypass alignment position.
9. An operating system for selectively rotating a valve stem of a coker switch valve into alignment positions for the valve to direct a stream of heavy oil to a first coke drum, a second coke drum, and a bypass, comprising:
  an actuator releasably engaging a stem adaptor for rotation about a central axis of the valve stem;
  a shear pin linkage between the stem adaptor and a locking plate to rotate the locking plate in response to rotation of the stem adaptor by the actuator;
  the locking plate releasably engaging the valve stem to rotate the valve stem in response to rotation of the locking plate;
  a mounting flange spool having a lower flange fixedly attached to a bonnet of the valve and an upper flange;
  diametrically opposing first and second lobes formed on the locking plate and extending outwardly to define an annular track adjacent the upper flange as a path of rotation of the lobes about the axis;
  a plurality of locking pins releasably securable to the upper flange at a like plurality of stop positions and extendable into the annular track to limit movement of the lobes in the annular track, thereby limiting rotation of the valve stem;
  wherein, when the valve stem is in an alignment position for the first or second coke drum, disengagement of the first and second ones of the locking pins from respective first and second stop positions and engagement of the third one of the locking pins allows rotation of the valve stem between the first and second coke drum alignment positions and prevents the valve stem from rotating to the bypass alignment position; and
  wherein, when the valve stem is in alignment position for the bypass, engagement of the first and second locking pins in the first and second stop positions, respectively, prevent rotation of the valve stem out of the bypass alignment position.
10. The system of embodiment 9, further comprising:
  wherein, when the valve stem is in alignment position for the first coke drum, engagement of the first and third locking pins in the first and third stop positions, respectively, prevent rotation of the valve stem out of the first coke drum alignment position; and
  wherein, when the valve stem is in alignment position for the second coke drum, engagement of the second and third locking pins in the second and third stop positions, respectively, prevent rotation of the valve stem out of the second coke drum alignment position.
11. The system of embodiment 9 or embodiment 10, wherein the second stop position is located about 30 degrees clockwise from the first stop position, and wherein the third stop position is located about 30 degrees counterclockwise from the first stop position.
12. The system of embodiment 11, wherein the lobes are dimensioned to match the spaces between the first and second locking pins engaged in the first and second stop positions and between the first and third locking pins engaged in the first and third stop positions.
13. The system of any of embodiments 9 to 12, wherein the first and second locking pins are axially oriented, and the third locking pin is oriented transversely.
14. The system of any of embodiments 9 to 13, further comprising:
  wherein the second stop position is located about 30 degrees clockwise from the first stop position, and wherein the third stop position is located about 30 degrees counterclockwise from the first stop position;
  wherein the lobes are dimensioned to match the spaces between the first and second locking pins engaged in the first and second stop positions and between the first and third locking pins engaged in the first and third stop positions; and
  wherein the first and second locking pins are axially oriented, and the third locking pin is oriented transversely.
15. A method of operating the system of any of embodiments 1 to 8 to selectively rotate the valve stem of the coker switch valve into alignment positions for the valve to direct the stream of heavy oil to the first coke drum, the second coke drum, and the bypass, comprising the steps of (a) operating the actuator to rotate the valve stem adaptor; and (b) reading the indicator to confirm rotation of the valve in (a).
16. The method of embodiment 15, further comprising, if torque applied to the locking plate exceeds a predetermined threshold, shearing the shear pin linkage, wherein the indicator continues to indicate a true position of the valve stem.
17. A method of operating the system of any of embodiments 5 to 14 to selectively rotate the valve stem of the coker switch valve into alignment positions for the valve to direct the stream of heavy oil to the first coke drum, the second coke drum, and the bypass, comprising the steps of:
  (a) disengaging at least two of the locking pins from the stop positions to enable switching the valve from one alignment position to another; and
  (b) after the switching of the valve in step (a), engaging at least two of the pins to lock the valve into the resulting alignment position.
18. The method of embodiment 17, wherein in step (a) one of the locking pins is engaged to prevent the valve from switching into an unintended alignment position.
19. The method of embodiment 17 or embodiment 18, further comprising:
  aligning the valve stem in position to direct the stream of heavy oil to the first coke drum, and engaging the first and third locking pins in the first and third stop positions, respectively, to prevent rotation of the valve stem out of the first coke drum alignment position; and
  aligning the valve stem in position to direct the stream of heavy oil to the second coke drum, and engaging of the second and third locking pins in the second and third stop positions, respectively, to prevent rotation of the valve stem out of the second coke drum alignment position.
20. The method of any of embodiments 17 to 19, further comprising locating the second stop position about 30 degrees clockwise from the first stop position, and locating the third stop position about 30 degrees counterclockwise from the first stop position.

21. The method of embodiment 20, further comprising dimensioning the lobes to match the spaces between the first and second locking pins engaged in the first and second stop positions and between the first and third locking pins engaged in the first and third stop positions.

22. The method of any of embodiments 17 to 21, further comprising orienting the first and second locking pins axially and orienting the third locking pin transversely.

23. The method of any of embodiments 17 to 22, further comprising:
    locating the second stop position about 30 degrees clockwise from the first stop position, and locating the third stop position about 30 degrees counterclockwise from the first stop position;
    dimensioning the lobes to match the spaces between the first and second locking pins engaged in the first and second stop positions and between the first and third locking pins engaged in the first and third stop positions; and
    orienting the first and second locking pins axially and the third locking pin transversely.

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 35 U.S.C. § 112(f) for any limitations of any of the claims herein, except for those in which the claim expressly uses the words 'means for' together with an associated function and without any recitation of structure. The priority document is incorporated herein by reference.

We claim:

1. An operating system for selectively rotating a valve stem of a coker switch valve between alignment positions of the valve for a first coke drum, a second coke drum, and a bypass, comprising:
    an actuator releasably engaging a stem adaptor for rotation about an axis of the valve stem;
    a shear pin linkage between the stem adaptor and a locking plate to rotate the locking plate in response to rotation of the stem adaptor by the actuator;
    the locking plate releasably engaging the valve stem to rotate the valve stem in response to rotation of the locking plate; and
    an indicator comprising a coaxial rod attached to the valve stem at a first end and attached to a transverse pointer at an opposite end of the rod extending through the actuator, wherein the rod and the pointer are rotated by the valve stem independently of the actuator.

2. The system of claim 1, wherein the shear pin linkage is designed to shear if torque applied to the locking plate exceeds a predetermined level to avoid damaging the valve in the event of a valve seizure and/or to avoid damaging the actuator.

3. The system of claim 1, further comprising proximity sensors to sense a proximity of the pointer when the valve is in the first coke drum alignment position, the second coke drum alignment position, or the bypass alignment position.

4. The system of claim 1, further comprising a scribe line on the valve stem and scribe lines on a gland flange of the valve corresponding to the first coke drum alignment position of the valve, the second coke drum alignment position of the valve, and the bypass alignment position of the valve.

5. The system of claim 1, further comprising:
    a mounting flange spool having a lower flange fixedly attached to a bonnet of the valve and an upper flange;
    diametrically opposing first and second lobes formed on the locking plate and extending outwardly into an annular track adjacent the upper flange as a path of rotation for the lobes about the axis of the valve stem;
    a plurality of locking pins releasably securable to the upper flange at a like plurality of stop positions and extendable into the annular track to limit movement of the lobes in the annular track, thereby limiting rotation of the valve stem.

6. The system of claim 5, wherein the locking pins comprise at least one axially oriented pin and at least one transversely oriented pin, wherein the locking pins cooperate with the lobes to hold the valve stem in a selected alignment position of the valve, wherein one locking pin is secured at a first stop position to limit movement of one of said lobes in a clockwise direction and another locking pin is secured at a second stop position to limit movement of one of said lobes in a counterclockwise direction, thereby locking the valve stem in the selected alignment position.

7. The system of claim 5, wherein a first and second ones of the locking pins in respective first and second stop positions prevent the lobes of the valve from passing between the first coke drum alignment position of the valve and the second coke drum alignment position of the valve, and wherein a third one of the locking pins in a third stop position prevents the lobes of the valve from entering the bypass alignment position of the valve, whereby disengagement of the first and second locking pins from the respective stop positions permits switching of the valve between the first and second coke drum alignment positions while engagement of the third locking pin in the third stop position prevents switching to the bypass alignment position of the valve.

8. The system of claim 7 wherein engagement of the first and third locking pins in the respective first and third stop positions locks the lobes of the valve in the first coke drum alignment position of the valve, engagement of the second and third locking pins in the respective second and third stop positions locks the lobes of the valve in the second coke drum alignment position of the valve, and wherein engagement of the first and second locking pins in the respective first and second stop positions locks the lobes of the valve in the bypass alignment position of the valve.

9. A method of operating the system of claim 5 to selectively rotate the valve stem of the coker switch valve into the alignment positions for the valve to direct a stream of heavy oil to the first coke drum, the second coke drum, or the bypass, comprising the steps of:
    (a) disengaging at least two of the locking pins from the stop positions to enable switching the valve from one alignment position to another; and
    (b) after the switching of the valve in step (a), engaging at least two of the pins to lock the valve into the resulting alignment position.

10. The method of claim 9, wherein in step (a) one of the locking pins is engaged to prevent valve from switching into an unintended alignment position.

11. The method of claim 10, further comprising:
    aligning the valve stem of the valve in the first coke drum alignment position of the valve to direct the stream of heavy oil to the first coke drum, and engaging the first and third locking pins in the first and third stop positions, respectively, to prevent rotation of the valve stem out of the first coke drum alignment position of the valve; and aligning the valve stem of the valve in the second coke drum alignment position of the valve to direct the stream of heavy oil to the second coke drum, and engaging the second and third locking pins in the second and third stop positions, respectively, to prevent rotation of the valve stem out of the second coke drum alignment position of the valve.

12. The method of claim 9, further comprising locating a second stop position about 30 degrees clockwise from a first stop position, and locating a third stop position about 30 degrees counterclockwise from the first stop position.

13. The method of claim 12, further comprising dimensioning the lobes to match the spaces between the first and second locking pins engaged in the first and second stop positions and between the first and third locking pins engaged in the first and third stop positions.

14. The method of claim 9, further comprising orienting first and second locking pins axially and orienting a third locking pin transversely.

15. The method of claim 9, further comprising:
  locating a second stop position about 30 degrees clockwise from a first stop position, and locating a third stop position about 30 degrees counterclockwise from the first stop position;
  dimensioning the lobes to match the spaces between the first and second locking pins engaged in the first and second stop positions and between the first and third locking pins engaged in the first and third stop positions; and
  orienting the first and second locking pins axially and the third locking pin transversely.

16. A method of operating the system of claim 1 to selectively rotate the valve stem of the coker switch valve between alignment positions of the valve to direct a stream of heavy oil to the first coke drum, the second coke drum, or the bypass, comprising the steps of (a) operating the actuator to rotate the valve stem adaptor; and (b) reading the indicator to confirm rotation of the valve stem in (a).

17. The method of claim 16, further comprising, if torque applied to the locking plate exceeds a predetermined threshold, shearing the shear pin linkage, wherein the indicator continues to indicate a true position of the valve stem.

18. An operating system for selectively rotating a valve stem of a coker switch valve between alignment positions for the valve to direct a stream of heavy oil to a first coke drum, a second coke drum, and a bypass, comprising:
  an actuator releasably engaging a stem adaptor for rotation about a central axis of the valve stem;
  a shear pin linkage between the stem adaptor and a locking plate to rotate the locking plate in response to rotation of the stem adaptor by the actuator;
  the locking plate releasably engaging the valve stem to rotate the valve stem in response to rotation of the locking plate;
  a mounting flange spool having a lower flange fixedly attached to a bonnet of the valve and an upper flange;
  diametrically opposing first and second lobes formed on the locking plate and extending outwardly into an annular track adjacent the upper flange as a path of rotation of the lobes about the axis;
  a plurality of locking pins releasably securable to the upper flange at a like plurality of stop positions and extendable into the annular track to limit movement of the lobes in the annular track, thereby limiting rotation of the valve stem;
  wherein, when the valve is in the alignment position for the first or second coke drum, disengagement of first and second ones of the locking pins from respective first and second stop positions and engagement of a third one of the locking pins allows rotation of the valve stem between the first and second coke drum alignment positions of the valve and prevents the valve stem of the valve from rotating to the bypass alignment position of the valve; and
  wherein, when the valve is in the bypass alignment position, engagement of the first and second ones of the locking pins in the first and second stop positions, respectively, prevents rotation of the valve stem of the valve out of the bypass alignment position of the value.

19. The system of claim 18, further comprising:
  wherein, when the valve is in the alignment position for the first coke drum, engagement of the first and third ones of the locking pins in the first and third stop positions, respectively, prevents rotation of the valve stem of the valve out of the first coke drum alignment position of the valve; and
  wherein, when the valve is in the second coke drum alignment position, engagement of the second and third ones of the locking pins in the second and third stop positions, respectively, prevents rotation of the valve stem of the valve out of the second coke drum alignment position of the valve.

20. The system of claim 19, further comprising:
  wherein the second stop position is located about 30 degrees clockwise from the first stop position, and wherein the third stop position is located about 30 degrees counterclockwise from the first stop position;
  wherein the lobes are dimensioned to match the spaces between the first and second locking pins engaged in the first and second stop positions and between the first and third locking pins engaged in the first and third stop positions; and
  wherein the first and second locking pins are axially oriented, and the third locking pin is oriented transversely.

21. The system of claim 18, wherein the second stop position is located about 30 degrees clockwise from the first stop position, and wherein the third stop position is located about 30 degrees counterclockwise from the first stop position.

22. The system of claim 21, wherein the lobes are dimensioned to match the spaces between the first and second locking pins engaged in the first and second stop positions and between the first and third locking pins engaged in the first and third stop positions.

23. The system of claim 18, wherein the first and second locking pins are axially oriented, and the third locking pin is oriented transversely.

\* \* \* \* \*

UNITED STATES PATENT AND TRADEMARK OFFICE
CERTIFICATE OF CORRECTION

PATENT NO. : 11,174,963 B2  
APPLICATION NO. : 16/493283  
DATED : November 16, 2021  
INVENTOR(S) : Anderson et al.

Page 1 of 2

It is certified that error appears in the above-identified patent and that said Letters Patent is hereby corrected as shown below:

In the Specification

In Column 1, Line 48, delete "needs" and insert -- is in need of --, therefor.

In Column 1, Line 56, delete "stem," and insert -- stem --, therefor.

In Column 1, Line 66, delete "into" and insert -- between --, therefor.

In Column 1, Line 67, delete "for the valve" and insert -- of the valve --, therefor.

In Column 2, Line 5, delete "rotate the" and insert -- rotate a --, therefor.

In Column 2, Line 16, delete "direct" and insert -- directed --, therefor.

In Column 2, Line 18, delete "into alignment positions for" and insert -- between alignment positions of --, therefor.

In Column 2, Line 22, delete "valve" and insert -- valve stem --, therefor.

In Column 2, Line 26, delete "into" and insert -- between --, therefor.

In Column 2, Line 27, delete "for the" and insert -- of the --, therefor.

In Column 2, Line 28, delete "and a" and insert -- or a --, therefor.

In Column 2, Line 40, delete "to define" and insert -- into --, therefor.

In Column 2, Line 41, delete "axis;" and insert -- axis of the valve stem; --, therefor.

In Column 2, Line 46, delete "stem is in an" and insert -- is in the --, therefor.

Signed and Sealed this  
Thirtieth Day of August, 2022

Katherine Kelly Vidal  
*Director of the United States Patent and Trademark Office*

CERTIFICATE OF CORRECTION (continued)
U.S. Pat. No. 11,174,963 B2

In Column 2, Line 47, delete "of the" and insert -- of --, therefor.

In Column 2, Line 50, delete "of the" and insert -- of a --, therefor.

In Column 2, Line 52, delete "positions" and insert -- positions of the valve --, therefor.

In Column 2, Line 53, delete "stem" and insert -- stem of the valve --, therefor.

In Column 2, Line 53, delete "position;" and insert -- position of the valve; --, therefor.

In Column 2, Line 54, delete "valve stem is in" and insert -- valve is in the bypass --, therefor.

In Column 2, Lines 54-55, delete "position for the bypass," and insert -- position, --, therefor.

In Column 2, Line 57, delete "stem out" and insert -- stem of the valve out --, therefor.

In Column 2, Line 62, delete "into" and insert -- into the --, therefor.

In Column 4, Line 33, delete "valve," and insert -- valve --, therefor.

In Column 6, Line 21, delete "pins is" and insert -- pins are --, therefor.

In Column 7, Line 67, delete "28" and insert -- 16 --, therefor.

In Column 12, Line 7, delete "oriented," and insert -- oriented --, therefor.

In Column 12, Line 22, delete "oriented," and insert -- oriented --, therefor.

In the Claims

In Column 14, in Claim 8, Line 40, delete "claim 7" and insert -- claim 7, --, therefor.

In Column 14, in Claim 10, Line 62, delete "prevent" and insert -- prevent the --, therefor.

In Column 16, in Claim 18, Line 22, delete "value." and insert -- valve. --, therefor.